United States Patent [19]

Schlosser

[11] Patent Number: 5,653,448
[45] Date of Patent: Aug. 5, 1997

[54] SLINGER SEAL

[75] Inventor: Kraig J. Schlosser, Ft. Wayne, Ind.

[73] Assignee: Dana Corporation, Toledo, Ohio

[21] Appl. No.: 665,681

[22] Filed: Jun. 18, 1996

[51] Int. Cl.⁶ .................................................. F16J 15/32
[52] U.S. Cl. ....................... 277/38; 277/44; 277/58; 277/96.2; 277/152; 277/153; 277/178; 277/183
[58] Field of Search ............................. 277/152, 153, 277/38, 44, 58, 178, 96.2, 183

[56] References Cited

U.S. PATENT DOCUMENTS

| | | | |
|---|---|---|---|
| 3,363,911 | 1/1968 | McKinven, Jr. | 277/65 |
| 3,510,138 | 5/1970 | Bowen et al. | 384/478 |
| 3,692,318 | 9/1972 | Day et al. | 277/164 |
| 4,426,094 | 1/1984 | Antonini | 277/153 |
| 4,427,202 | 1/1984 | Backlin | 277/68 |
| 4,428,586 | 1/1984 | Romero | 277/153 |
| 4,639,149 | 1/1987 | Bras et al. | 384/477 |
| 4,747,603 | 5/1988 | Sugino et al. | 277/26 |
| 4,974,860 | 12/1990 | Anzue et al. | 277/152 |
| 4,986,552 | 1/1991 | Anzue et al. | 277/152 |
| 5,022,659 | 6/1991 | Otto | 277/152 |
| 5,137,284 | 8/1992 | Holder | 277/96.2 |
| 5,183,269 | 2/1993 | Black et al. | 277/152 |
| 5,186,548 | 2/1993 | Sink | 384/486 |
| 5,292,199 | 3/1994 | Hosbach et al. | 384/478 |
| 5,398,942 | 3/1995 | Duckwall et al. | 277/38 |
| 5,462,287 | 10/1995 | Hering et al. | 277/152 |
| 5,553,870 | 9/1996 | Czekansky et al. | 277/134 |

Primary Examiner—William A. Cuchlinski, Jr.
Assistant Examiner—Christina Annick
Attorney, Agent, or Firm—Oldham & Oldham Co., LPA

[57] ABSTRACT

Slinger seal assembly for sealing an annular space between two relatively rotatable members, i.e., an inner member, such as a rotatable shaft, and an outer member, such as a stationary housing. The slinger seal assembly shown and described includes a first rigid metallic outer case member which is frictionally supported on the housing and which extending inwardly toward the shaft, and an elastomeric shaft seal supported on the inner end of this outer case member. The slinger seal assembly of this invention also includes a slinger, which is frictionally supported on a shaft member, in this case a flange at the outer end of the shaft and rotatable with the shaft, for securing a further shaft. The slinger seal assembly further includes a second thin, generally annular rigid outer case member which is frictionally supported on the housing and which extends radially inwardly therefrom, and a second sealing element, or slinger seal, which is supported on an outer end of the slinger and is in sealing engagement with the second outer case member. The second outer case member and the slinger seal enclose a cavity surrounding part of the shaft seal which was previously open to dust and dirt, thereby appreciably reducing the amount of dust and dirt which reach the shaft seal and prolonging the life of the shaft seal.

17 Claims, 2 Drawing Sheets

1

SLINGER SEAL

TECHNICAL FIELD

This invention relates to seal assemblies for sealing and annular space between an inner and an outer member which are spaced apart and rotatable relative to one another. More particularly, this invention relates to a slinger seal assembly for sealing an annular space between a shaft and a housing which is spaced from the shaft and at least partially surrounds the shaft.

BACKGROUND OF THE INVENTION

Sealing assemblies for sealing an annular space between an inner member, such as a shaft, and an outlet member, such as a housing, which are rotatable relative to one another, are well known. One general type of sealing assembly is a radial lip seal assembly. Such seal assemblies are widely used in automotive vehicles, including trucks and off-road vehicles, such as farm equipment, and construction vehicles, to keep out dust and dirt and to keep in lubricant. There are substantial variations in the structures of radial lip seal assemblies. However, radial lip seal assemblies commonly include a thin, rigid structural element, commonly known as an outer case member, which extends generally radially inwardly from the housing and which supports a shaft seal (usually elastomeric) that engages an outer cylindrical surface of the shaft, and a radial lip which is carried on the shaft and extends generally radially outwardly. The radial lip aids in keeping out dust and dirt.

While the housing or outer member is usually stationary, and the shaft or inner member is usually rotatable, this is not always the case. For example, a radial lip seal assembly for sealing an annular space between a stationary axle spindle and a rotatable wheel hub (which serves as a housing) surrounding the axle spindle at the outer end of an automotive vehicle axle is well known.

Although presently known radial lip seals keep out dust and dirt to some extent, they still permit appreciable quantities of dust and dirt to reach the shaft seal. As a result, shaft seals have a high failure rate, and most failures are caused by external contamination.

SUMMARY OF THE INVENTION

A seal assembly according to the present invention, for sealing an annular space between an inner member or shaft and an outer member or housing which are spaced from each other and rotatable relative to one another includes a first annular rigid case member mounted on the outer member and extending generally radially inwardly therefrom, a first sealing element carried by the first annular rigid outer member and in sealing engagement with the inner member, and a slinger supported on the inner member and extending generally radially outwardly. The seal assembly according to this invention further includes a second annular rigid outer case member mounted on the outer member and extending generally radially inwardly, and a second sealing element supported on an outer edge of the slinger and in sealing engagement with the second rigid outer case member.

The second outer case member and the second seal, which is supported on the slinger, coact to keep out dust and dirt which would get past the slinger of a conventional slinger seal assembly and thereby reach the shaft seal, appreciably shortening the seal's life. The slinger seal assembly of the present invention appreciably reduces the amount of dust and dirt contamination reaching the shaft seal, thereby greatly prolonging the life of the shaft seal.

DESCRIPTION OF THE PREFERRED EMBODIMENTS

A seal assembly according to this invention may be used generally to provide sealing engagement between an inner member and an outer member which are spaced apart and rotatable relative to one another. In particular, the inner member may be a shaft which has a cylindrical outer surface, and the outer member may be a housing which at least partially surrounds the shaft and which has a bore or an opening with a cylindrical surface which is spaced radially outwardly from the shaft. Normally the shaft is rotatable and the housing in nonrotatable, although the reverse may be the case. This invention will be described with particular reference to a preferred embodiment thereof, in which the shaft is an output shaft of an automotive vehicle differential and the housing is a nonrotatable differential housing.

Figure 1:
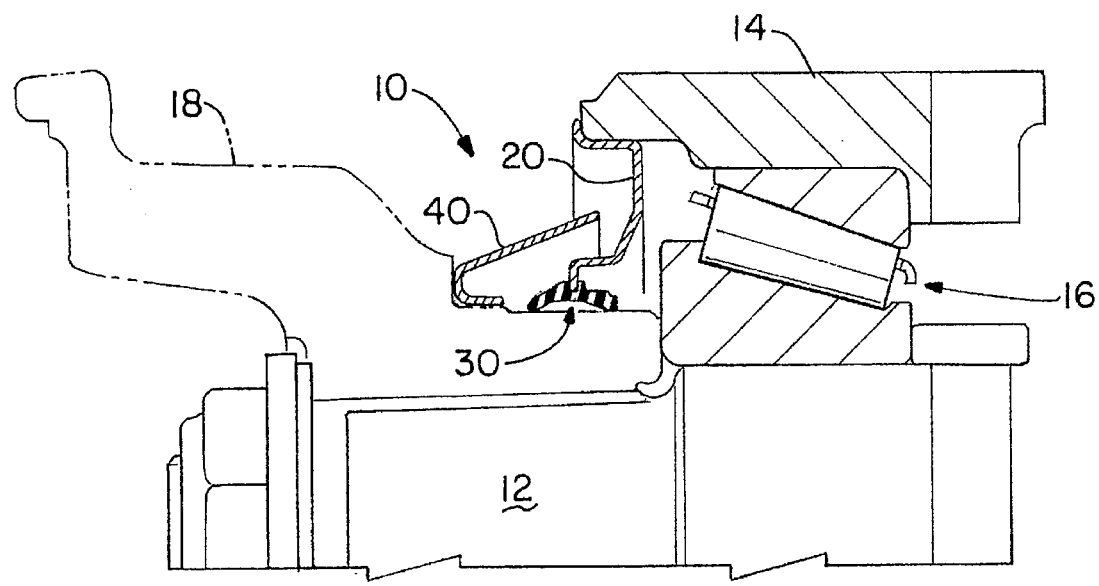
FIG. 1 is a longitudinal view, shown partly in section, of a slinger seal assembly according to the prior art.

FIG. 1 illustrates a radial lip seal assembly according to the prior art. In FIG. 1, 10 is a slinger seal assembly according to the prior art, which seals an annular space between a rotatable shaft 12 and a stationary housing 14 which is spaced therefrom. This rotatable shaft may be a rotatable input shaft of an automotive vehicle differential, and the housing 14 may be a differential housing. The rotatable shaft 12 is journaled for rotation in housing 14 by means of bearing assemblies including a bearing assembly 16, which may be conventional. A yoke 18 may be provided at the outer end of rotatable shaft 12 for coupling the shaft 12 to an axially aligned shaft (not shown) such as a drive shaft which extends from the differential to the transmission of the automotive vehicle. The rotatable shaft 12 and the flange 18, which is fixedly secured to the shaft so that it rotates with the shaft, together form part of a rotatable shaft assembly or inner member. The sealing assembly 10 is interposed between a cylindrical outer circumferential surface on the flange 18 and a cylindrical inner surface on the housing 14, the space between these surfaces being annular.

A seal assembly according to the prior art, as shown in FIG. 1, comprises a thin, annular rigid metallic outer case member 20 which is frictionally mounted on base 14 and extends generally radially inwardly from the base 14, terminating in an inner circumferential edge, and a resilient elastomeric sealing element 30 which is supported on the outer case member 20 at the inner circumferential edge thereof. The outer case member 20 and the sealing element 30 are nonrotatable since the outer case member 20 is fixedly mounted on base 14. Sealing element 30 sealingly engages a cylindrical outer surface of flange 18.

Seal assembly 10 further comprises a slinger 40, which is frictionally mounted on flange 18 so that it rotates with shaft 12 and flange 18. The slinger 40 illustrated in FIG. 1 includes a base portion which frictionally engages flange 18, and a frusto-conical portion which extends from the base portion, both axially toward outer case member and radially outwardly from the shaft 12 and flange 18, terminating in a circumferential outer edge which lies radially outwardly from the shall sealing element 30.

It will be appreciated that the seal assembly illustrated in FIG. 1 is but one of numerous radial lip sealing assemblies which are known in the art.

Although slinger 40 keeps some dust and dirt away from sealing element 30, it is apparent that appreciable quantities of dust and dirt are able to reach sealing element 30 by going around the outer edges of slinger 40. As a result, a sealing element, such as sealing element 30 shown herein, has a short life on average, and failures of such elements due to dust and dirt contamination than to frictional wear caused by relative rotation of sealing element 30 and flange 18.

A slinger seal assembly 110 according to this invention will now be described with reference to FIGS. 2 and 3. Like reference numerals denote like pans throughout the specification so that reference numerals which are the same in FIGS. 2 and 3 as in FIG. 1 denote parts which are not modified.

Figure 2:
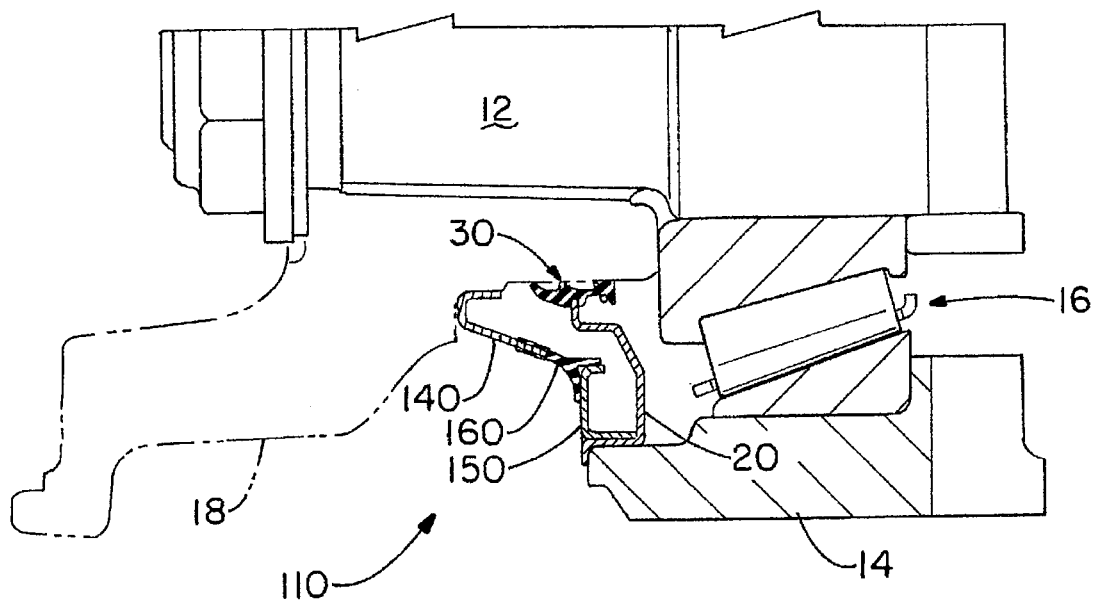
FIG. 2 is a fragmentary longitudinal view, shown partly in section, of a slinger seal in accordance with this invention.
Figure 3:
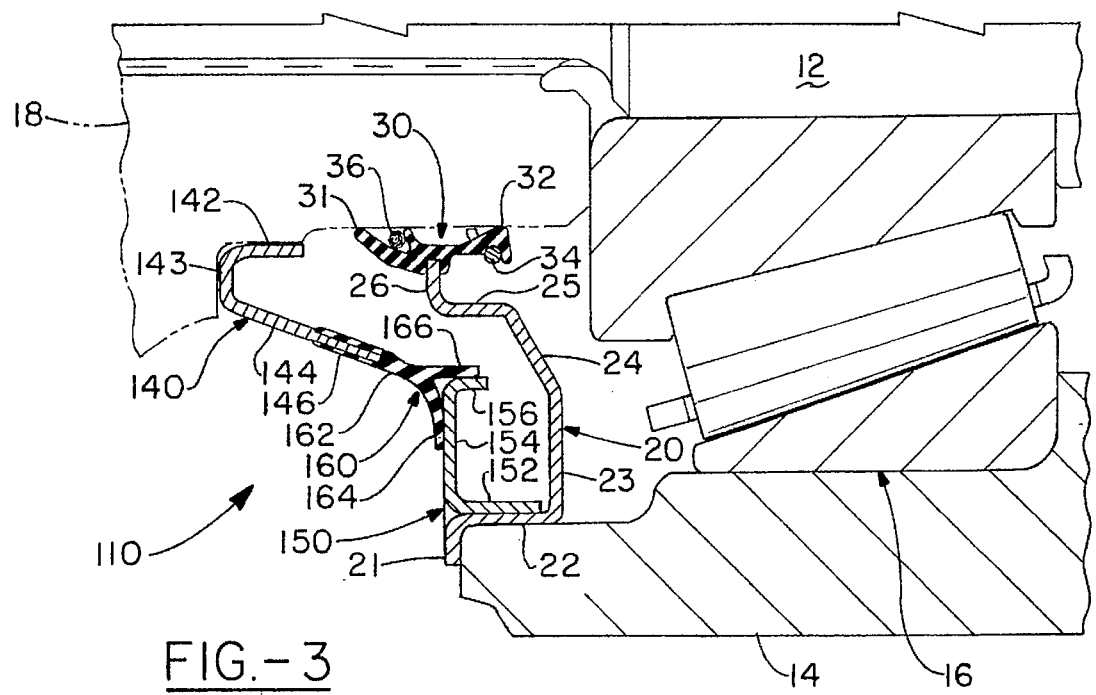
FIG. 3 is an enlarged longitudinal view, shown partly in section, of a portion of the apparatus shown in FIG. 2, illustrating in detail the sealing assembly according to this invention.

A slinger seal assembly 110 according to this invention, as shown in FIGS. 2 and 3, comprises a first thin annular, rigid, metallic outer case member 20 which is frictionally mounted on base 14 and extends generally radially inwardly from the base 14, and a first resilient elastomeric sealing element 30 which is supported on the outer case member 20 at the inner circumferential edge thereof. The outer case member 20 and the sealing member 30 are nonrotatable since the outer case member 20 is fixedly mounted on base 14. Sealing element 30 sealingly engages a rotatable cylindrical outer surface of flange 18.

Slinger seal assembly 110 further comprises a slinger 140, which is frictionally mounted on flange 18 so that it rotates with shaft 12 and flange 18. The slinger 140 illustrated in FIGS. 2 and 3 includes a base portion which frictionally engages flange 18, and a frusto-conical portion which is foreshortened compared to its counterpart in FIG. 1, so that a circumferentially extending outer end of the slinger 140 may receive a second sealing element 160.

Slinger seal assembly 110 according to this invention further comprises a second annular rigid metallic outer case member 150 which is frictionally and fixedly mounted on the housing 14, so that it is nonrotatable, and a second resilient elastomeric sealing element 160 which is supported on an outer edge of the slinger 140 and in sealing engagement with the second annular rigid outer case member 150. Since the second sealing element is rotatable with the slinger 140 and with shaft 12 and flange 18, the second sealing element 160 and the shown outer case member 150 are relatively rotatable.

The parts forming a sealing assembly 110 according to this invention will now be described in greater detail with particular reference with to FIG. 3.

Referring now to FIG. 3, a first outer case member 20 (which may be identical to its counterpart shown in FIG. 1) is a thin annular rigid metallic part which comprises, from a circumferentially extending outer edge to a circumferentially extending inner edge, a radially extending annular portion 21, an axially extending base portion 22, which together constitute a base that frictionally engages housing 14, and a radially inwardly extending annular and planar portion 23, a frusto-conical portion 24, a axially extending portion 25, and a radially inwardly extending portion 26, which together constitute a generally radially inwardly extending portion of the first outer case member 20. The radially extending portion 26 has a circumferentially extending inner edge which is also the circumferential extending inner edge of the to case member as a whole. This inner edge and the portion of the radial portion 26 adjacent thereto forms a support for seating member 30.

Sealing element 30 may also be conventional and like its counterpart shown in FIG. 1. Sealing element 30 is elastomeric and resilient and comprises first and second lips 31 and 32, respectively, both of which engage a rotatable cylindrical surface of flange 18. A circumferentially extending garter spring 34 may be provided. A grease pack (optional) may be provided on an inner side of sealing element 30, if desired.

Slinger 140 in the apparatus of this invention includes an axially extending and generally cylindrical base portion 142 which is in frictional engagement with flange 18 along an outer cylindrical surface of the flange, a curved portion 143 which abuts against a shoulder in flange 18, and a generally frusto-conical and outwardly extending portion 144 which terminates in a circumferential outer edge. Slinger 140 is a rigid structure which is preferably made of thin sheet metal. Slinger 140 is similar to prior art slinger 40, shown in FIG. 1, except that the frusto-conical portion 144 is shortened in order to receive elastomeric seal 160.

Elastomeric-seal 160 may be secured to slinger 140 at the outer edge 146 of the slinger by desired means, as, for example, by molding the elastomeric seal 160 to the slinger 140 at its outer edge 146, or by chemical bonding.

Slinger seal 110 of this invention further includes a second annular outer case member 150 which is mounted on the seal surface or base portion 22 and which extends generally radially inwardly therefrom. More particularly, this second annular outer case member 150 comprises a axially extending cylindrical base portion 152 and a radially inwardly extending annular leg portion 154. Finally, the second outer case member 150 includes a short axially extending flange portion 156 which extends from an inner circumferential edge of leg portion 154 in a direction away from slinger 140. The cross-sectional shape of the second outer case member 150 resembles the letter capital "J."

The base portion 152 of the second outer case member 150 is in abutting relationship with the base portion 22 of the first outer case member 20, which, in turn, is in abutting relationship with the cylindrical surface of housing 14, so that both the first outer case member and the second outer case member 150 are supported in frictional engagement by the housing 14 and are stationary.

The second outer case member 150 is a rigid structure which is preferably made of thin sheet metal.

Finally, the slinger seal assembly 110 includes a second sealing element or slinger seal 160, which is a resilient elastomeric seal. Slinger seal 160 is bifurcated and includes a shank portion 162 and two lips 164 and 166 projecting therefrom. An end of the shank portion 162 is fixedly mounted relative to slinger 140 at the outer end 146 thereof, so that shaft 12, flange 18, slinger 140, and slinger seal 160 all rotate together. The cross-sectional shape of slinger seal 160 resembles a capital "Y" or a wishbone. The first lip 164 is in sealing engagement against the radially extending leg portion 154 of the second outer case member 150, and the second lip 166 is in sealing engagement against the flange portion 156 of second outer case member 150.

The second outer case member 150 is positioned axially outboard of the first outer case member 20 (i.e., to the left as seen in FIGS. 2 and 3) and inboard (i.e., to the right as seen in FIGS. 2 and 3) of slinger 140. In other words, the second outer case member 150 is situated between the first outer case member and the slinger 140. This configuration is important in making the sealing arrangement between the second outer case member 150 and the slinger seal 160 possible.

Figure 4:
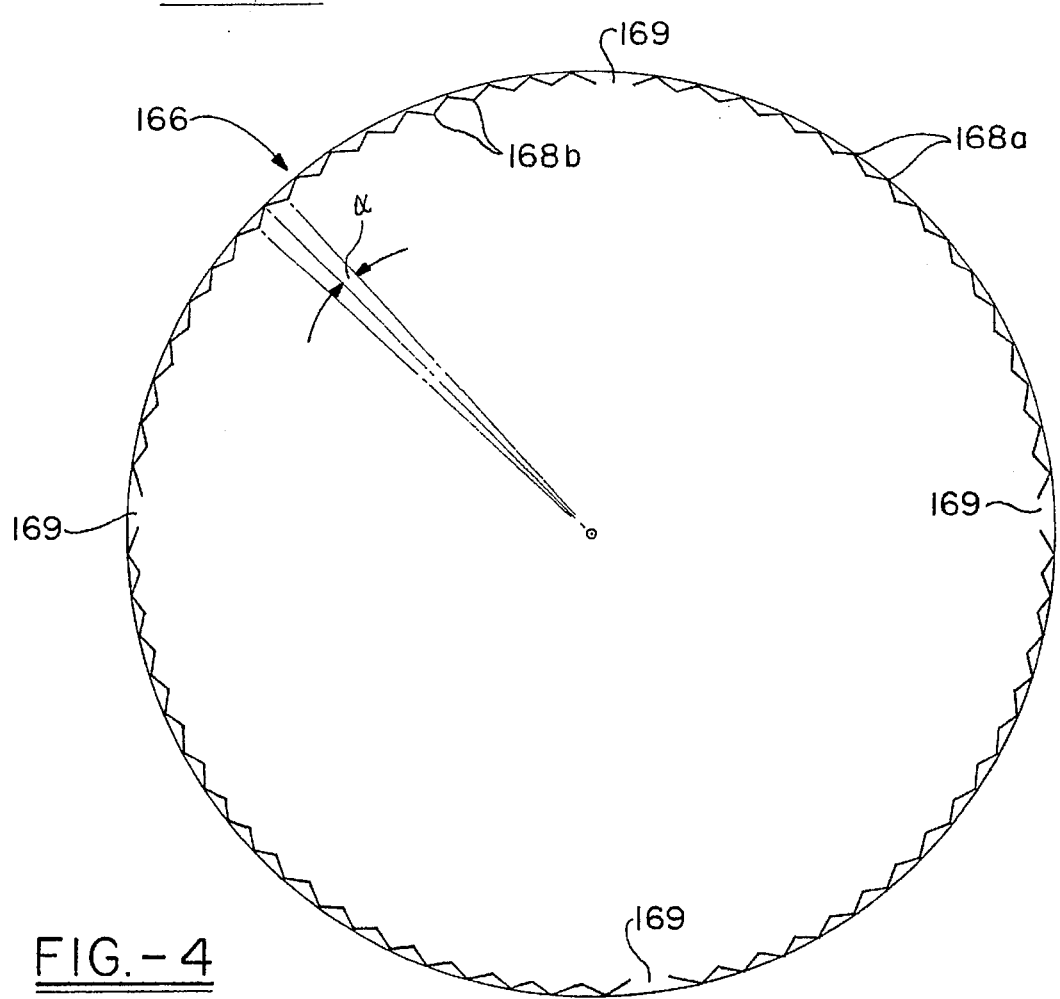
FIG. 4 is a schematic representation, on an enlarged scale, of an outer edge of a sealing element in accordance with this invention.

Helices or angled ridges may be provided at the outer edges of both lips 164 and 166 of slinger seal 160 to keep out dirt. Referring to FIG. 4, the outer edge of axially extending lip 166 may be provided with a plurality of serrations 168 extending around the circumference of the lip. These serrations are characterized by alternating peaks 168a and valleys 168b. The half-width of each serration (from a peak 168a to an adjacent valley 168b) may be any desired small angle α, say 2.5°. A plurality of open areas or openings 169, say four, uniformly spaced 90° apart are provided for venting. A similar construction can be provided for the outer end of radially extending lip 164.

The second outer case member 150 and the slinger seal 160 coact to provide an enclosure in which the primary or shaft seal 30 (or at least the outboard portion of that seal to the left of leg portion 26 of first outer case member 20), is enclosed. This enclosure keeps out dust and dirt far more effectively than any slinger seal arrangement presently known in the art. This greatly prolongs the life of a shaft seal 30.

The slinger seal assembly 110 of this invention has been described with particular reference to a preferred embodiment thereof in which the slinger seal encloses and seals an annular space between a rotatable output shaft 12 and flange 18 attached thereto on the one hand and a stationary differential case 14 on the other. It will be apparent that the sealing assembly of this invention can be used in other situations to seal an annular space between two relatively rotatable members. For example, the slinger seal assembly of this invention can be used to seal an annular space between an axle spindle (a stationary inner member) and a rotatable wheel hub (a rotatable outer member) which surrounds the axle spindle in spaced relationship.

While this invention has been described in detail with particular reference to the best mode and preferred embodiment thereof, it shall be understood that the detailed description herein is by way of illustration and not by way of limitation. Various modifications can be made within the scope of this invention. For example, a shaft sealing element, such as 30 herein, can seal directly against a rotatable shaft rather than against a flange, as illustrated herein.

What is claimed is:

1. A seal assembly for sealing an annular space between an inner member and an outer member which are spaced from each other and rotatable relative to one another, said seal assembly comprising:
   (a) a first annular rigid outer case member mounted on said outer member and extending generally radially inwardly therefrom;
   (b) a first sealing element supported on said first annular rigid outer case member and in sealing engagement with said inner member;
   (c) a slinger supported on said inner member and extending generally radially outwardly therefrom;;
   (d) a second annular rigid outer case member mounted on said outer member and extending generally radially inwardly therefrom; and
   (e) a second sealing element supported on an outer edge of said slinger and in sealing engagement with said second annular rigid outer case member:

wherein said second annular outer case member has an axially extending base portion and a radially inwardly extending leg portion and wherein said leg portion is disposed axially between said first outer case member and said slinger.

2. A seal assembly according to claim 1 wherein said inner member comprises a shaft and said outer member comprises a housing.

3. A seal assembly according to claim 2 wherein said shaft is rotatable and said housing is nonrotatable.

4. A seal assembly according to claim 1 wherein said inner member has a cylindrical outer surface and said outer member has a cylindrical inner surface spaced from the cylindrical outer surface of the inner member.

5. A seal assembly according to claim 1 wherein said rigid outer case members are formed of sheet metal.

6. A seal assembly according to claim 1 wherein said sealing elements are resilient and elastomeric.

7. A seal assembly according to claim 1 wherein said second annular outer case member further includes a flange portion which extends from an inner circumferential edge of said leg portion in a direction away from said slinger.

8. A seal assembly according to claim 7 wherein said second sealing member has two lips, said lips including a first lip which sealingly engages said leg portion of said second annular outer case member and a second lip which sealingly engages said flange portion of said second portion of said second outer case member.

9. A seal assembly according to claim 8 in which the outer ends of said lips are each provided with a plurality of serrations extending around a circumference of said lip and with a plurality of uniformly spaced openings for venting.

10. A seal assembly for sealing an annular space between an inner member and an outer member which are spaced from each other and rotatable relative to one another, said seal assembly comprising:
   (a) a first annular outer case member mounted on said outer member and extending generally radially inwardly therefrom;
   (b) a first sealing element supported on said first annular outer case member and in sealing engagement with said inner member;
   (c) a slinger supported on said inner member and extending generally radially outwardly therefrom;
   (d) a second annular outer case member mounted on said outer member and extending generally radially inwardly therefrom; and
   (e) a second sealing element supported on an outer edge of said slinger and in sealing engagement with said second annular outer case member, said second sealing element including first and second lips, said first and second lips sealingly engaging different portions of said second outer case member.

11. A seal assembly according to claim 10 wherein said inner member comprises a shaft and said outer member comprises a housing.

12. A seal assembly according to claim 10 wherein said sealing elements are resilient and elastomeric.

13. A seal assembly according to claim 10 wherein said second annular outer case member has an axially extending base portion and a radially inwardly extending leg portion.

14. A seal assembly according to claim 13 wherein said leg portion is disposed axially between said first outer case member and said slinger.

15. A seal assembly according to claim 13 wherein said second annular outer case member further includes a flange portion which extends from an inner circumferential edge of said leg portion in a direction away from said slinger.

16. A seal assembly according to claim 15 wherein said first lip sealingly engages said leg portion of said second annular outer case member and said second lip sealingly engages said flange portion of said second portion of said second outer case member.

17. A seal assembly according to claim 10 in which the outer ends of said lips are each provided with a plurality of serrations extending around a circumference of said lip and with a plurality of uniformly spaced openings for venting.

* * * * *